No. 805,079. PATENTED NOV. 21, 1905.
F. G. & L. F. KOEHLER.
GAS ECONOMIZER AND PURIFIER.
APPLICATION FILED AUG. 22, 1905.
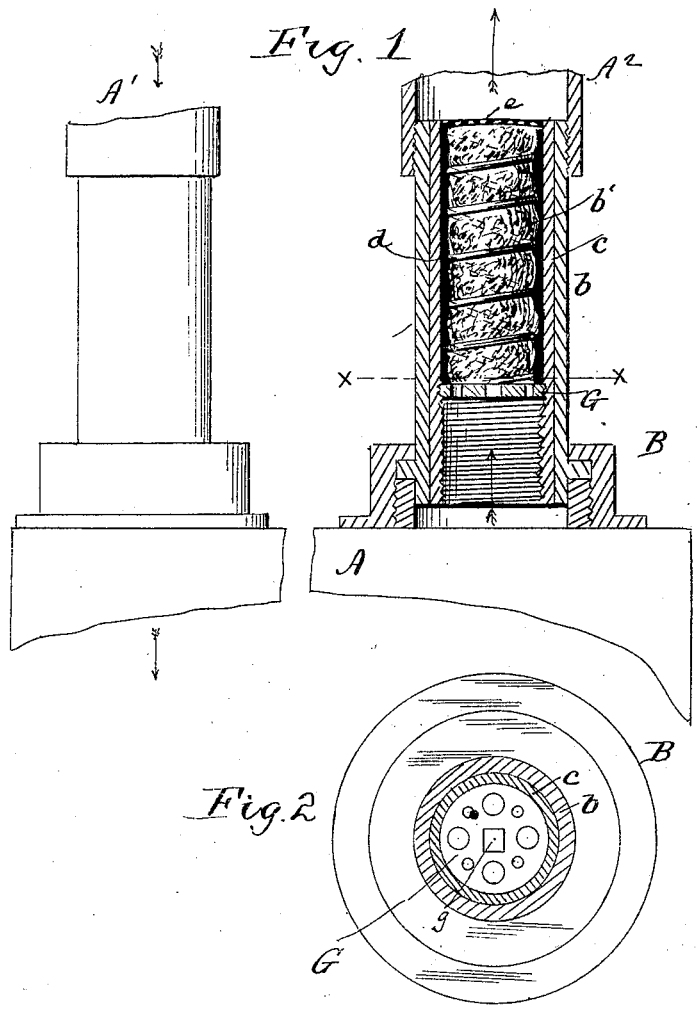

UNITED STATES PATENT OFFICE.

FRANZ G. KOEHLER AND LOUIS F. KOEHLER, OF PHILADELPHIA, PENNSYLVANIA.

GAS ECONOMIZER AND PURIFIER.

No. 805,079.  Specification of Letters Patent.  Patented Nov. 21, 1905.

Application filed August 22, 1905. Serial No. 275,322.

*To all whom it may concern:*

Be it known that we, FRANZ G. KOEHLER and LOUIS F. KOEHLER, citizens of the United States, residing at Philadelphia, in the county of Philadelphia and State of Pennsylvania, have invented certain new and useful Improvements in Gas Economizers and Purifiers, of which the following is a specification, reference being had therein to the accompanying drawings.

This invention has relation to means for economizing in the consumption of gas used either for illuminating or heating purposes, and has for its object the provision of novel devices and appliances to be located in the main distributing-pipe leading from the meter to the distributing branches for regulating the pressure and flow of the gas to meet the requirements of perfect combustion and for taking up and absorbing the coal-tar and other impurities which tend to decrease the illuminating and heating qualities of the gas.

The invention consists in the novel construction, combination, and arrangement of devices hereinafter described and claimed.

In the accompanying drawings, Figure 1 is a vertical central sectional view of a part of the distributing-pipe leading from a gas-meter of any suitable type. Fig. 2 is a transverse sectional view on the line $x\ x$ of Fig. 1.

In the drawings, A designates a part of the meter, and A' A² the inlet and outlet or supply and distributing pipes leading into and out of the meter.

B designates the ordinary union-coupling, by which the outlet or distributing pipe is connected to the outlet-nozzle of the meter, and within this union-coupling are located and properly arranged the parts embodying our invention.

For the purposes of our invention we fit within the member $b$ of the coupling a cylindrical section of tubing $c$, which is preferably of equal length with the member $b$ and is slightly tapered and roughly finished, so that when pressed upward in the member $b$ it will fit sufficiently tight to be held in place. Within this section $c$ we arrange a trimmed section or piece of fine sponge $b'$, of the quality known as "silk sponge," the object of which is to serve the double purpose of filtering the gas passing through it from coal-tar and other liquid and semiliquid constituents and impurities and of regulating the pressure of the gas so that its pressure at the burners will be just sufficient for the purposes of perfect combustion. The sponge is surrounded by a spiral metallic spring $d$, the upper end of which bears against a perforated or wire-gauze partition $e$, fitted to the upper end of the section $c$, while the lower end of the spring rests upon an externally-threaded and adjustable partition G, fitted in the lower end of the section $c$, the latter being interiorly screw-threaded, as shown, so that the nut G may be screwed up within the section $c$ to compress the sponge and spring. The partition G is formed with a central square opening $g$ for the insertion of the end of a square tool, by which the nut is turned and adjusted. The sponge acts as a retardent to the flow and pressure of gas, and its effectiveness depends on its density in proportion to the normal flow or pressure, and this is properly and definitely regulated and controlled by means of the nut G. As the normal pressure of gas varies at different meters, the density of the sponge is regulated and adjusted according to circumstances, the pressure of gas being first tested at the outlet of each meter and the proper adjustment of the sponge made accordingly. After the section $c$ containing the sponge and spring have been arranged in position and the union tightened up no further adjustment, regulation, or handling are required until the sponge becomes clogged with impurities, which will be only after several months' service. The coupling can then be taken apart and the sponge renewed. We have found, however, that within reasonable limits the sponge improves and becomes more effective and reliable after being in use for a considerable time.

The purpose of the spring surrounding the sponge is to enable the sponge to be brought to the exact required condition of compression when the regulator is being first tested and applied, and such spring is an obvious necessity, as it closely embraces the sponge and causes the latter to expand when, by the turning outward of the nut G, the spring is relaxed. Without the spring the density of the sponge could not be delicately regulated, as it would not properly expand to conform to the adjustment of the nut G.

The devices or elements constituting our invention are obviously simple and inexpensive and have the great advantage of being applicable to the ordinary meter unions without any alteration whatever in the meter, the pipes, or any of the supply devices or equipment of the house or building to which our devices are applied. All the parts constituting or embracing our invention are contained within the detachable section $c$, and this may be inserted in any union member or section of pipe adapted to receive it. The section $c$, with its contained parts, constitutes a distinct article of manufacture, forming a very valuable and salable adjunct to the gas-fitters' supplies.

Having described our invention, what we claim, and desire to secure by Letters Patent, is—

1. The herein-described gas-pressure regulator and purifier comprising the section $c$, the sponge-filling $b'$, the spring $d$ embracing the sponge, and the perforated, adjustable partition G, said section $c$, with its contained parts being adapted to be inserted in and removed from an ordinary gas-pipe union or coupling member without disarrangement of its parts, substantially as described.

2. The combination with the gas-supply pipe leading from a meter to the distributing branches, and with the union coupling said pipe to the meter, of the section $c$, sponge $b'$, spring $d$ embracing said sponge, and the adjustable partition G against which the spring bears and by which the spring and sponge are compressed.

In testimony whereof we affix our signatures in presence of two witnesses.

FRANZ G. KOEHLER.
LOUIS F. KOEHLER.

Witnesses:
CLYDE B. WEIKERT,
THOS. A. CONNOLLY.